Figure 1:
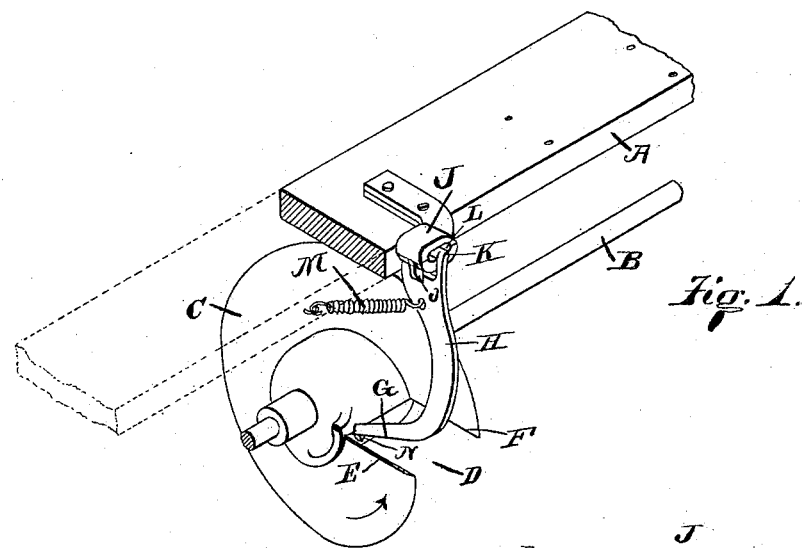

(No Model.)

H. P. DEUSCHER & W. J. SNIDER.
HARROW CLEANER.

No. 423,032.  Patented Mar. 11, 1890.

Witnesses:
A. C. Rogers.
C. Crawford.

Inventors
Henry P. Deuscher
Worthington J. Snider
by James W. See
Attorney

UNITED STATES PATENT OFFICE.

HENRY P. DEUSCHER, OF HAMILTON, AND WORTHINGTON J. SNIDER, OF MADISON, ASSIGNORS TO THE H. P. DEUSCHER COMPANY, OF HAMILTON, OHIO.

HARROW-CLEANER.

SPECIFICATION forming part of Letters Patent No. 423,032, dated March 11, 1890.

Application filed July 1, 1889. Serial No. 316,158. (No model.)

*To all whom it may concern:*

Be it known that we, HENRY P. DEUSCHER, of Hamilton, Butler county, Ohio, and WORTHINGTON J. SNIDER, of Madison city, (post-office address Heno,) Butler county, Ohio, have invented certain new and useful Improvements in Harrow-Cleaners, of which the following is a specification.

This invention pertains to cleaners for the disks of disk harrows, in which each disk takes the form of an interrupted helix.

The application of scrapers to ordinary disk harrows presents no serious problem, it being sufficient that a scraping-edge shall be properly pressed against the side of the disk which is to be scraped. Such scraper remains motionless, except as to those slight side vibrations requisite to enable the scraper to accommodate itself to slight facial irregularities of the disk; but when the disks are slitted radially and the edges offset, so that each disk forms an interrupted helix, as illustrated, for instance, in United States Patent No. 401,994, dated April 23, 1889, a new set of conditions present themselves in connection with the application of the scrapers. As the disk revolves, the scraper has a movement of translation in order to follow the helix. This is easily arranged for by supporting the scraper so as to be capable of the proper movement, and by holding it to its work by means of the usual spring, as in the patent above mentioned. A scraper thus mounted will act satisfactorily so long as the disks revolve in the normal direction due to the forward travel of the harrow. The scraper will not, however, scrape the entire face of the disk, owing to the fact that when the scraper reaches the terminal edge of the convolution of the disk and suddenly moves forward to begin again on the initial edge, the supporting-arm of the scraper will maintain contact with the terminal edge of the disk, and the scraping-edge will be prevented for a time from properly reaching the surface of the disk. This fault is incident even to the normal direction of rotation of the disk; but when the disk rotates in the opposite direction, as incident to the backing or turning of the harrow, the scraping-edge is liable and quite apt to move forward, under the action of the spring, beyond the initial edge of the convolution, and when the disk again turns in the proper direction the initial edge of the convolution passes to the rear of the scraper instead of in front of it, thus disorganizing the entire action. So far as we are aware we are the first to produce a scraper which is practically operative on a disk harrow having disks each of which has the form of an interrupted helix.

Our invention will be readily understood from the following description, taken in connection with the accompanying drawings, in which—

Figure 4:
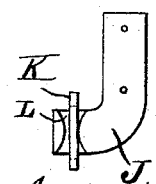
Figure 2:
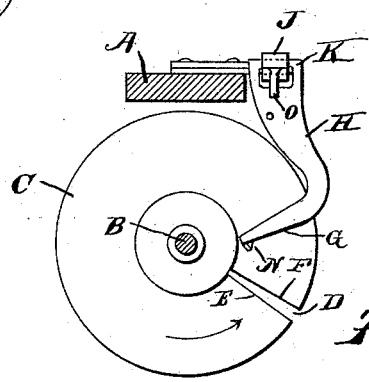
Figure 3:
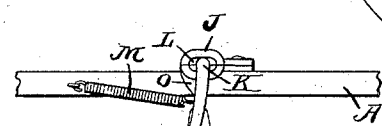

Figure 1 is a perspective view of a scraper exemplifying our improvements shown in connection with a single disk of a harrow of the class illustrated in the patent referred to; Fig. 2, a face view of the disk and scraper, the gang-beam and gang-shaft appearing in vertical section, the face of the disk which is exposed to view being the one which is not to be scraped—the same face which presents itself to view in Fig. 1; Fig. 3, a rear elevation of the scraper and disk, &c., and Fig. 4 a plan of the scraper-hanger with the upper portion removed to exhibit the scraper-pivot seated in the bearing of the hanger.

In the drawings, A indicates the usual gang-beam; B, the usual gang-shaft on which the harrow-disks are to be strung and secured in the usual manner; C, the helical disk formed and secured to the gang-shaft in the usual manner; D, the gap of the disk, formed, as usual, by slitting the disk radially and by separating the edges, so that the disk presents the aspect of one convolution of a helix; E, that edge of the slit which moves toward the scraper when the disk is rotating in the normal direction, as indicated by the arrow, this edge being hereinafter spoken of as the "initial edge" of the disk; F, the other edge of the disk, hereinafter spoken of as the "terminal edge;" G, the scraping-edge, arranged substantially radial to the axis of the disk and having such contour as will adapt it to fit the surface of the disk which is to be scraped—that is to say, if the disk be flat in general contour, then the scraping-edge will be straight, while if the disk be concave, then the scraping-edge will be correspondingly curved; H, the scraper-arm, reaching from the outer end of the scraper upward to the point of pivotal support, this arm being, in a general way, tangent to the periphery of the disk, so that, during oscillations of the arm, the arm will not come into contact with the disk; J, the pivot-hanger of the scraper-arm, the same consisting, in the exemplification, of a pair of castings, top and bottom, bolted to the gang-beam over the disk, presenting a horizontal bearing-eye transverse of the gang-shaft; K, the pivot at the upper end of the scraper-arm, disposed within the eye of the hanger, so that the lower end of the scraper-arm and the scraper are at liberty to swing back and forth to accommodate the scraper to the helical surface of the disk; L, a flaring at each end of the eye of the hanger, whereby the pivot of the scraper-arm is at liberty to rock horizontally, or, in other words, whereby the scraper-arm is rendered capable of a twisting motion; M, the usual spring attached to the gang-beam and scraper-arm, and tending to hold the scraper toward the surface of the disk; N, a toe upon the scraper-edge, presenting itself downwardly and inclined from the scraper-edge rearwardly; and O, a stop on the pivot-hanger, adapted to engage the scraper-arm and limit the forward motion of the same.

By inspecting Fig. 2 it will be understood that as the disk revolves in the direction of the arrow (the normal direction) the initial edge of the slit will pass up in front of the scraper-edge, and that the scraper will then bear against the rear surface of the disk and scrape that surface, and that as the disk revolves the scraper will yield backwardly and accommodate itself to the helical surface of the disk, the arm H being entirely exterior to the disk, not interfering with the continued contact or motion of the scraper-edge. When the disk rotates so far that the terminal edge F of the slit passes the scraper, then the scraper will suddenly move forward under the action of the spring and re-engage at the initial edge of the disk. Assume now that the pivot K of the scraper-arm fits fairly in the eye of the hanger. Then it will be apparent that the scraper-arm would be incapable of twisting, and it follows that the scraper-edge could only fit the surface of the disk at some one particular point in the rotation of the disk—that is to say, if the scraper-edge would be set to fit the disk at one point of rotation it would at all other points be away from the disk either at the heel or at the point of the scraper; but the twisting motion with which the scraper-arm is endowed by virtue of the flaring of the hanger-eye permits the scraper to have a bearing throughout its entire length during the entire revolution of the disk. The flaring of the hanger-eye gives to the pivotal support virtually two axes—one horizontal, the other vertical—one permitting the oscillation of the scraper-arm, the other permitting its twisting. Any joint of articulation having this characteristic will answer in place of the flared hanger-eye.

Referring now again to Fig. 2, let it be assumed that the harrow has been backed so as to turn the disk in a direction the reverse of that indicated by the arrow, and that the initial edge E of the slit has gotten below the scraper, as indicated in the figure. The spring will then, of course, tend to pull the scraper forward as far as the stop O will permit. Now when the harrow is started forward again the initial edge E of the slit, in the absence of preventive means, passes up behind the scraper, and thereafter the disk will be practically without a scraper, and no location or adjustment of the stop O will serve to prevent this fatal disorganization of the parts; but we provide the scraping-edge with the inclined toe N, inclining downwardly and rearwardly from the edge of the scraper. The stop O, or any equivalent stop, can readily be so located that while the scraper-edge may have passed forward of the initial edge the inclined toe has not entirely done so, and consequently when the disk rotates in the proper direction after backing the initial edge of the slit will engage the toe and push the scraper back until the scraper-edge goes into the proper contact with the surface of the disk and the parts proceed to act in a normal manner.

The device is entirely automatic and solves all of the observed problems in connection with the scraping of the disks of this class of harrows.

We do not claim to be the first inventors of the combination, with a gang-shaft provided with a series of spiral cutters, of pivoted scrapers conforming to the shape of said cutters and provided with contracting springs.

We claim as our invention—

1. In a cleaner for an interrupted helical disk harrow, the combination, substantially as set forth, of a scraper-edge adapted to engage the surface of the disk to be cleaned, a scraper-arm formed with or attached to the outer end of the scraper and without the circle of the disk and provided with a pivot at its end distant from the scraper, a hanger engaged by the pivot of the scraper-arm, and a spring attached to the scraper-arm and tending to urge the scraper toward the surface of the disk to be cleaned.

2. In a cleaner for an interrupted helical disk harrow, the combination, substantially as set forth, of a scraper-edge adapted to engage the surface of the disk to be cleaned, a scraper-arm formed with or attached to the outer end of the scraper and without the circle of the disk, a hanger engaging the end of said scraper-arm distant from the scraper by a joint of articulation having a vertical axis and a horizontal axis, and a spring attached to the scraper and tending to urge the scraper toward the surface of the disk to be cleaned.

3. In a cleaner for an interrupted helical disk harrow, the combination, substantially as set forth, of a scraper-edge adapted to engage the surface of the disk to be cleaned and provided with a toe inclining downwardly and rearwardly, a scraper-arm formed with or attached to the outer end of the scraper and without the circle of the disk and provided with a pivot at its end distant from the scraper, a hanger engaged by the pivot of the scraper-arm, and a spring attached to the scraper-arm and tending to urge the scraper toward the surface of the disk to be cleaned.

HENRY P. DEUSCHER.
WORTHINGTON J. SNIDER.

Witnesses:
E. A. BELDEN,
J. W. SEE.